United States Patent
Barak

(10) Patent No.: US 10,294,780 B2
(45) Date of Patent: May 21, 2019

(54) MUD PULSE TELEMETRY PREAMBLE FOR SEQUENCE DETECTION AND CHANNEL ESTIMATION

(71) Applicant: HALLIBURTON ENERGY SERVICES INC., Houston, TX (US)

(72) Inventor: Ehud Barak, Houston, TX (US)

(73) Assignee: HALLIBURTON ENERGY SERVICES, INC, Houston, TX (US)

(*) Notice: Subject to any disclaimer, the term of this patent is extended or adjusted under 35 U.S.C. 154(b) by 0 days.

(21) Appl. No.: 15/753,412

(22) PCT Filed: Oct. 8, 2015

(86) PCT No.: PCT/US2015/054667
§ 371 (c)(1),
(2) Date: Feb. 19, 2018

(87) PCT Pub. No.: WO2017/062009
PCT Pub. Date: Apr. 13, 2017

(65) Prior Publication Data
US 2018/0245461 A1    Aug. 30, 2018

(51) Int. Cl.
*H04L 7/04* (2006.01)
*H04L 7/10* (2006.01)
(Continued)

(52) U.S. Cl.
CPC .......... *E21B 47/18* (2013.01); *G01V 11/002* (2013.01); *H04L 7/041* (2013.01); *H04L 25/03* (2013.01);
(Continued)

(58) Field of Classification Search
CPC .......... E21B 47/12; E21B 47/14; E21B 47/18; E21B 47/182; E21B 47/185;
(Continued)

(56) References Cited

U.S. PATENT DOCUMENTS

| 4,787,093 A | 11/1988 | Rorden |
| 6,016,288 A * | 1/2000 | Frith ............... E21B 47/187 181/102 |

(Continued)

FOREIGN PATENT DOCUMENTS

| EP | 0 617 196 A2 | 9/1994 |
| GB | 2 147 722 A | 5/1985 |

(Continued)

OTHER PUBLICATIONS

International Search Report and the Written Opinion of the International Search Authority, or the Declaration, dated Feb. 4, 2016, PCT/US2015/054667, 9 pages, ISA/KR.

(Continued)

*Primary Examiner* — Hai Phan
*Assistant Examiner* — Franklin D Balseca

(57) ABSTRACT

A method and system of mud pulse telemetry uses a preamble having a number of periods of a synchronization sequence followed by a single period of a channel estimation sequence. The synchronization may be characterized by a generally flat frequency spectrum, and the channel estimation sequence may be characterized by a low cross-correlation with said synchronization sequence. The sequences may be generated from a set of nonrepeating discrete sequences. The preamble may be suitable for both sequence detection and channel estimation, satisfy all the physical and/or electronic constraints of the system, and allow for fast convergence of an adaptive channel tracking or equalization system.

17 Claims, 5 Drawing Sheets

(51) Int. Cl.
  *E21B 47/18* (2012.01)
  *G01V 11/00* (2006.01)
  *H04L 25/02* (2006.01)
  *H04L 25/03* (2006.01)

(52) U.S. Cl.
  CPC .......... *E21B 47/182* (2013.01); *E21B 47/185* (2013.01); *E21B 47/187* (2013.01); *H04L 7/043* (2013.01); *H04L 7/10* (2013.01); *H04L 25/0224* (2013.01)

(58) Field of Classification Search
  CPC ....... E21B 47/187; G01V 11/002; H04L 7/04; H04L 7/041; H04L 7/043; H04L 7/046; H04L 7/10; H04L 25/03; H04L 25/0224
  See application file for complete search history.

(56) References Cited

U.S. PATENT DOCUMENTS

| | | | |
|---|---|---|---|
| 6,661,857 | B1 | 12/2003 | Webster et al. |
| 6,753,791 | B2 | 6/2004 | Wei et al. |
| 7,015,694 | B2 | 3/2006 | Blümich |
| 7,245,229 | B2 | 7/2007 | Baron et al. |
| 8,749,400 | B2 | 6/2014 | Robbins |
| 9,008,066 | B2 * | 4/2015 | Taghavi Nasrabadi .. H04B 1/69 370/341 |
| 2003/0198308 | A1 | 10/2003 | Hoctor et al. |
| 2004/0257241 | A1 | 12/2004 | Menger |
| 2006/0055556 | A1 | 3/2006 | Memarzadeh et al. |
| 2007/0189119 | A1 | 8/2007 | Klotz |
| 2009/0180524 | A1 | 7/2009 | Wang et al. |
| 2009/0290670 | A1 | 11/2009 | Eng et al. |
| 2011/0013724 | A1 | 1/2011 | Metreaud et al. |
| 2011/0286309 | A1 | 11/2011 | Sugiura |
| 2012/0307839 | A1 | 12/2012 | Ionescu et al. |

FOREIGN PATENT DOCUMENTS

| | | |
|---|---|---|
| WO | WO 2013/126054 A1 | 8/2013 |
| WO | WO 2013/173575 A1 | 11/2013 |

OTHER PUBLICATIONS

Supplementary Search Report issued for European Patent Application No. 15905951.8, dated Jul. 13, 2018, 6 pages.

* cited by examiner

MUD PULSE TELEMETRY PREAMBLE FOR SEQUENCE DETECTION AND CHANNEL ESTIMATION

PRIORITY

The present application is a U.S. National Stage patent application of International Patent Application No. PCT/US2015/054667, filed on Oct. 8, 2015, the benefit of which is claimed and the disclosure of which is incorporated herein by reference in its entirety.

TECHNICAL FIELD

The present disclosure relates generally to oilfield equipment, and in particular to downhole tools, drilling and related systems and techniques for drilling, completing, servicing, and evaluating wellbores in the earth. More particularly still, the present disclosure relates to telemetry systems and methods.

BACKGROUND

Hydrocarbon drilling and production operations demand a great quantity of information relating to parameters and conditions downhole. Such information may relate characteristics of the earth formations traversed by the wellbore, along with the size and configuration of the wellbore itself. The collection of information relating to conditions downhole may be termed "logging."

Operators often log a wellbore during the drilling process, thereby eliminating the necessity of removing the drilling assembly to insert a wireline logging tool to collect the data. Data collection during drilling also enables the operator to make accurate modifications or corrections as needed to steer the well or optimize drilling performance while minimizing down time. Measurement-While-Drilling (MWD) and/or Logging-While-Drilling (LWD) tools and techniques allow measurement and/or logging of various conditions within the wellbore and/or the surrounding rock formations during drilling operations. MWD/LWD tools may employ a variety of sensors to sample and aggregate digital values for continuous real-time telemetering to the surface during drilling operations. The transmission scheme and channel medium may vary.

Mud pulse telemetry is one of the most common methods used to send data from the bottom of a well to the surface while drilling. Mud pulse telemetry uses drilling fluid that is circulated through the well during drilling as a communication channel. That is, the column of drilling mud that is pumped down through the drill string becomes a medium for sending data. Pressure pulses generated by a telemetry transmitter at a bottom hole assembly (BHA) send information to the well surface. In positive-pulse systems, a valve or other form of flow restrictor creates pressure pulses in the fluid flow by adjusting the size of a constriction in the drill string. In negative-pulse systems, a valve creates pressure pulses by releasing fluid from the interior of the drill string to the annulus. In both system types, the pressure pulses propagate at the speed of sound through the drilling fluid to the surface, where they may be detected various types of transducers.

Data transfer rates in mud pulse telemetry systems tend to be relatively low, on the order of 30 bits per second in shallow wells and ten bits per second in deep wells of actual downhole data. The transmission channel is bandwidth limited and may have noise created by drilling pumps, cutting action of the drill bit, and other sources. The downhole telemetry transmitter may also have physical and electronic constraints, resulting in a low, or even negative (as measured in dB), signal-to-noise ratio (SNR).

Attempts to increase data transfer rates may result in intersymbol interference (ISI), a form of distortion of a signal in which one data symbol interferes with one or more subsequent symbols, causing successive symbols to "blur" together. The presence of ISI in the mud pulse telemetry system may introduce errors at the telemetry receiver.

One way to mitigate the effects of ISI is to apply adaptive equalization, channel tracking, and/or error correcting codes at the telemetry receiver, that, broadly speaking, attempts to undo the effects of the channel by applying an inverse filter. Adaptive equalization and adaptive channel tracking may require a good estimation of the channel impulse response, so that an inverse of the channel impulse response may be applied to the received signal to reconstruct the original signal. A chirp signal, a frequency stepped signal, a pseudo random sequence, or a binary pseudo random signal may be used as a reference to estimate the channel impulse response either in the time domain, using cross-correlation, or in the frequency domain. Divergence of channel tracking or adaptive equalization, with concomitant data errors, may occur if the initial estimate of the channel impulse response is too far from the correct solution.

BRIEF DESCRIPTION OF THE DRAWINGS

Embodiments are described in detail hereinafter with reference to the accompanying figures, in which.

DETAILED DESCRIPTION

Figure 1:
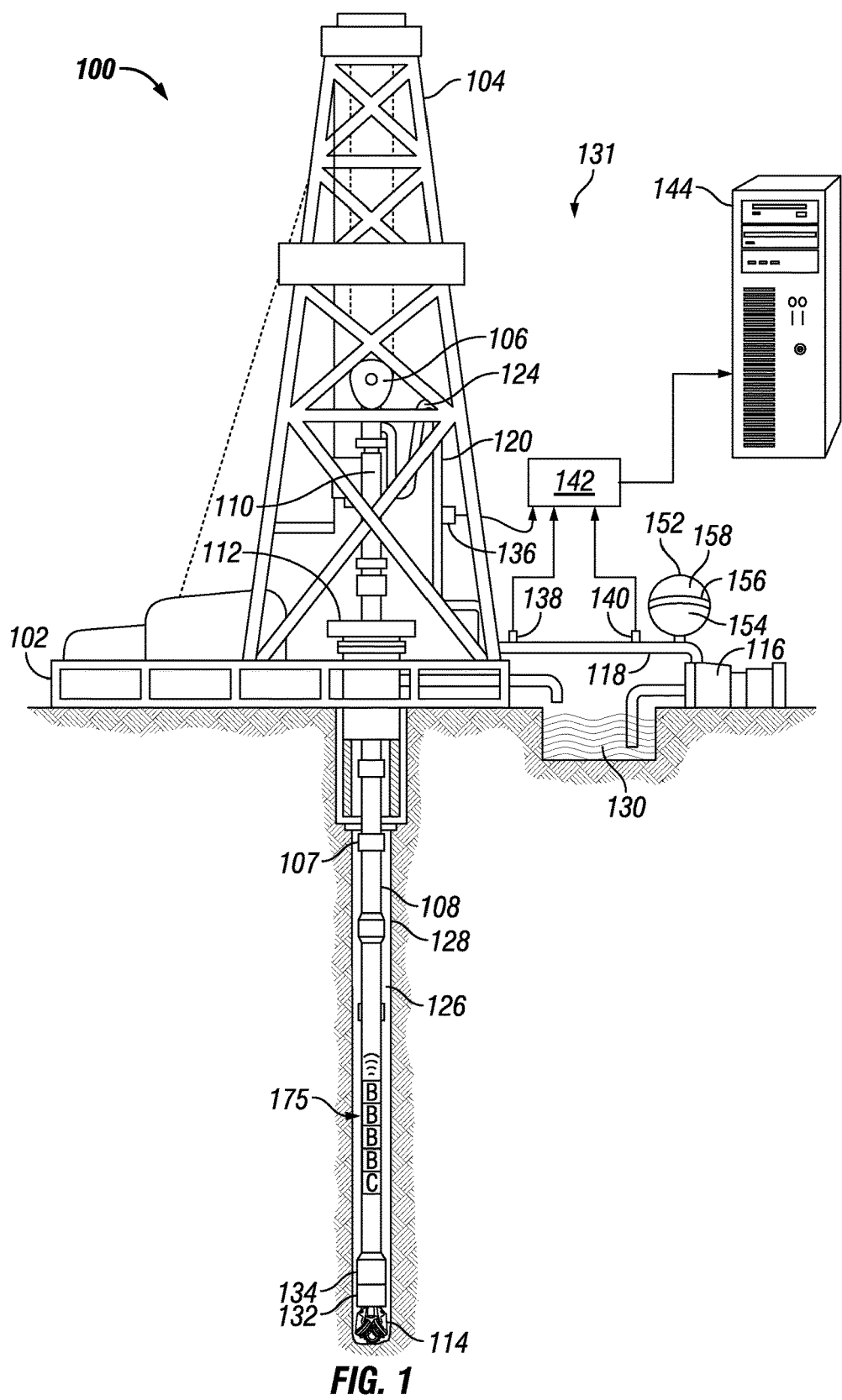
FIG. 1 is an elevation view in partial cross section of a MWD/LWD system that employs mud pulse telemetry according to an embodiment.

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

FIG. 1 shows an exemplary MWD/LWD system 100 according to one or more embodiments. MWD/LWD system 100 employs a signal preamble that can be used for both the detection/data synchronization and channel estimation of the downhole mud pulse telemetry system. More specifically, the disclosed preamble combines both the periodicity needed for detection and synchronization and the randomness needed for channel estimation, yet allows flexibility to comply with all the mechanical and/or electronic constraints of MWD/LWD system 100, as described in greater detail hereinafter. Good initial channel estimation may allow adaptive equalization or adaptive channel tracking at the telemetry receiver to commence the adaptation process from a solution that is close to the final solution, thereby allowing good data detection with minimum errors from the beginning, as well as preventing divergence of the channel tracking or the equalization that could otherwise happen if the initial channel response estimate is too far from the correct solution. Accordingly, MWD/LWD system 100 may allow an accurate detection of transmitted data even in a very noisy environment.

Referring to FIG. 1, MWD/LWD system 100 may include a drilling platform 102. Platform 102 may be equipped with a land derrick 104, which may support a hoist 106. However, MWD/LWD system 100 may be used in association with drilling rigs deployed on offshore platforms, semi-submersibles, drill ships, or any other drilling system for forming a wellbore.

Drilling of a well may be carried out by a string of drill pipes connected together by joints 107 to form a drill string 108. Hoist 106 may suspend a top drive 110 that may be used to rotate the drill string 108 and to lower drill string 108 through a wellhead 112. However, a swivel, rotary table and kelly joint, or other suitable arrangement, may be used in lieu of or in addition to top drive 110.

A drill bit 114 may be connected to the lower end of drill string 108. Drill bit 114 may be rotated by rotating drill string 108, by use of a downhole motor near the drill bit (illustrated as part of bottom hole assembly (BHA) 132 described below), or by both methods. Drilling fluid may be pumped by mud pump 116 through flow line 118, stand pipe 120, goose neck 124, top drive 110, and down through drill string 108 at high pressures and volumes to emerge through nozzles or jets (not specifically illustrated) in drill bit 114. The drilling fluid may then travel back up the wellbore via the annulus 126 formed between the exterior of drill string 108 and the wellbore wall 128, through a blowout preventer (not specifically shown), and into a mud pit 130 on the surface. On the surface, the drilling fluid may be cleaned and recirculated by mud pump 116. The drilling fluid may function to cool the drill bit 114, to carry cuttings from the base of the bore to the surface, and to balance the hydrostatic pressure in the rock formations.

In wells employing mud pulse telemetry for MWD/LWD, BHA 132 may include various downhole tools that collect data regarding the formation properties and/or various drilling parameters. The downhole tools are coupled to a downhole telemetry transmitter 134, which may be part of BHA 132, that transmits the data to the surface. In one or more embodiments, telemetry transmitter 134 may modulate a resistance to drilling fluid flow to generate pressure pulses that propagate at the speed of sound within the drilling fluid to the surface.

A telemetry receiver 131 may be located at the surface of the well. In one or more embodiments, telemetry receiver 131 may include various pressure transducers, such as transducers 136, 138 and 140, a digitizer 142, and a data processor 144. Transducers 136, 138, 140 may convert the transmitted pressure signal into electrical signals, which may be sampled by signal digitizer 142 (e.g., an analog to digital converter). While three transducers 136, 138 and 140 are illustrated, a greater or lesser number of transducers may be used in particular situations. Digitizer 142 may supply a digital representation of the pressure signals to a data processor 144. Data processor 144 may operate in accordance with software (which may be stored on a computer-readable storage medium) to process and decode the received signals. The resulting telemetry data may be further analyzed and processed to generate a display of useful information. For example, an operator may obtain and monitor bottom hole assembly position and orientation information, drilling parameters, and formation properties.

Telemetry transmitter 134 may generate a traveling pressure signal representative of measured downhole parameters. In an ideal system, each and every pressure pulse created downhole propagates uphole and is readily detected by a transducer at the surface. However, drilling fluid pressure may fluctuate significantly and contain noise from several sources (e.g., bit noise, torque noise, and mud pump noise). Bit noise may be created by vibration of the drill bit during the drilling operation. Torque noise may be generated downhole by the action of the drill bit sticking in a formation, causing the drill string to torque up. Finally, mud pump 116 may create cyclic noise as the pistons within the pump force the drilling fluid into drill string 108.

For this reason, in one or more embodiments, drilling system 100 may contain a dampener or desurger 152 to reduce noise. Flow line 118 may couple to a drilling fluid chamber 154 within desurger 152. A diaphragm or separation membrane 156 may separate the drilling fluid chamber 154 from a gas chamber 158. Diaphragm 156 may oscillate with variations in the drilling fluid pressure, thus enabling the gas chamber to expand and contract and thereby absorb and mitigate pressure fluctuations. Although desurger 152 may minimize pressure fluctuations, desurger 152 and/or mud pump 116 may also act as reflective devices. That is, pressure pulses propagating from the telemetry transmitter 134 may reflect off the desurger 152 and/or mud pump 116, and propagate back downhole. These reflections may create interference that, in some cases, adversely affects the ability to determine the presence of the pressure pulses propagating from telemetry transmitter 134.

Figure 2:
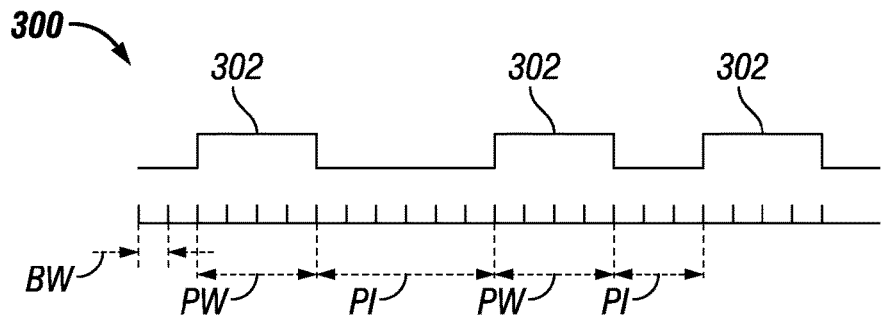
FIG. 2 is a diagram that illustrates an exemplary binary signal produced by the system of FIG. 1 according to an embodiment, illustrating high and low pulses of various pulse widths as measured in bit widths.

Referring to FIG. 2, telemetry transmitter 134 (FIG. 1) is arranged to transmit a signal modulated by pressure pulses 302 (which may be defined either by a high pressure pulse or a low pressure pulse) in the drilling fluid column (the communications channel). In one or more embodiments, the signal may be modulated by differential pulse-position modulation (DPPM). However, other modulation schemes, such as pulse-position modulation (PPM), pulse width modulation (PWM), quadrature phase shift keying (QPSK), pulse amplitude modulation (PAM), or a combination thereof, may also be used.

In an embodiment using DPPM, the width of each pulse 302 is fixed and may be defined by a number PW, which may be a function of physical and/or electronic constraints of the transmitter and communications channel. The transmitted signal is modulated by varying the time intervals PI between successive pulses 302. Pulse intervals PI may vary between a minimum value $PI_{min}$ and a maximum value $PI_{max}$. As with PW, $PI_{min}$ and $PI_{max}$ may be a function of physical and/or electronic constraints of the transmitter and communications channel.

PW, $PI_{min}$, and $PI_{max}$ may all be further defined as integral multiples of a fixed time duration, known as bit width (BW). This unit is also known to routineers as a chip. FIG. 2 shows an example of a transmitted signal 300 with three pulses 302 of PW=4BW separated by a first pulse interval PI=6BW and a second pulse interval PI=3BW. Although pulse interval PI is described in FIG. 2 as the interval between the trailing edge of preceding pulse and leading edge of the subsequent pulse, it may equally be defined as the interval between the leading edges of the preceding and subsequent pulses.

An initial function of telemetry receiver 131 may be the detection the beginning of a transmitted signal from telemetry transmitter 134. In one or more embodiments, detection may be performed by transmitting a preamble 175 with a known digital sequence that the receiver can detect for data synchronization. One of the challenges of mud pulse telemetry is the detection of the beginning of the transmitted sequence in a very noisy environment. Sequence detection may require a reliable detection algorithm that can work even at a negative (as measured in dB) signal-to-noise ratio (SNR). Once the known digital preamble sequence is detected, the decoding process may be commenced. In order to be able decode with minimum errors, a good estimate of the channel impulse response may be required for adaptive equalization or adaptive channel tracking. Estimation of the channel impulse response may be another function of telemetry receiver 131.

Telemetry transmitter 134 and the communications channel may be characterized by many physical and electronic constraints. For instance, the pulse width PW defining the pulses may be constrained to minimum and maximum durations and there may be minimum and maximum delays $PI_{min}$, $PI_{max}$ allowed between pulses. Preamble 175 may include random sequences "B" and "C" of digital pulses that meet all the system constraints of telemetry transmitter 134. In one or more embodiments, as shown in FIG. 1, preamble 175 includes a number of periods of a synchronization sequence "B" to provide enough periodicity so it can be used for sequence detection and timing synchronization, followed by a channel estimation sequence "C" to still provide ample randomness to allow a good channel impulse response estimate to be generated.

Figure 3A:
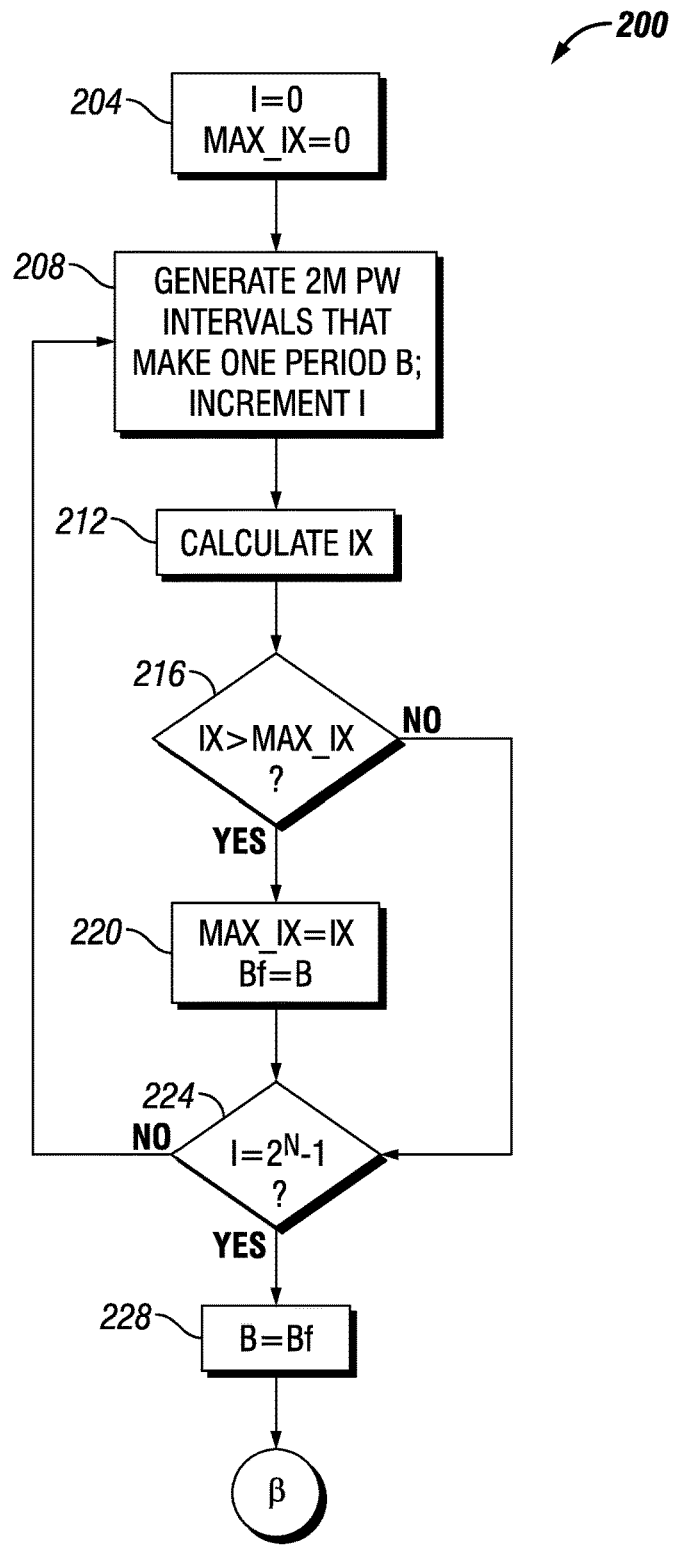
FIGS. 3A and 3B are a flow chart of a method for generating a mud pulse telemetry preamble according to an embodiment, for use in the system of FIG. 1.
Figure 3B:
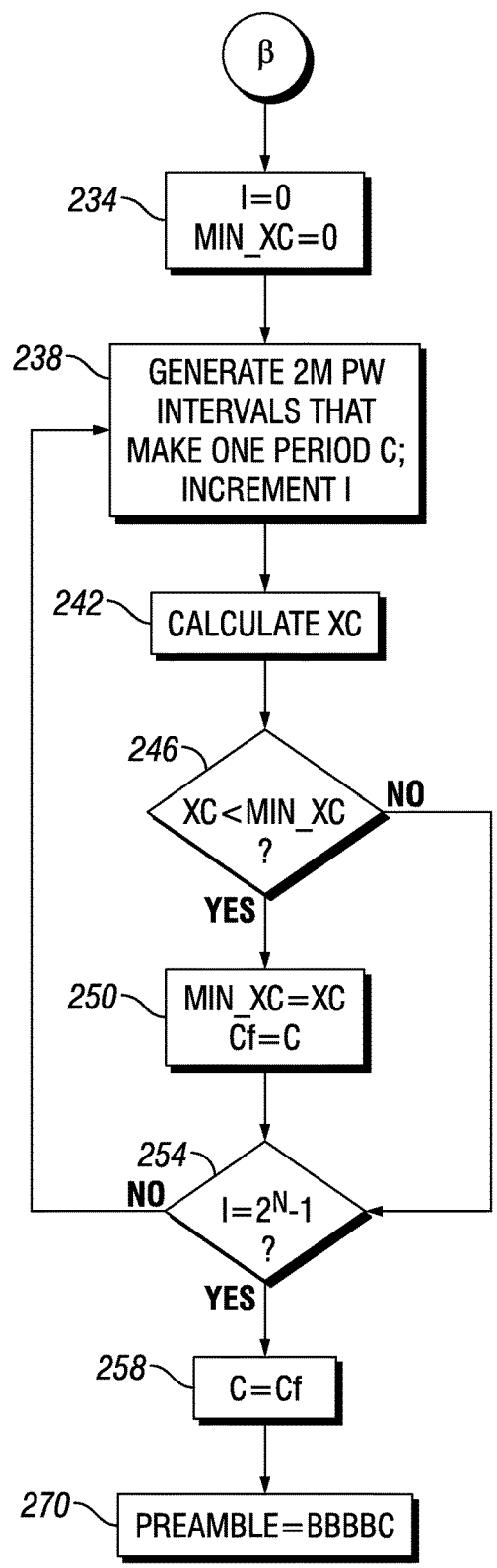

FIGS. 3A and 3B are a flow chart of a method 200 for creating mud pulse telemetry preamble 175 according to one or more embodiments. Steps 204-228 of FIG. 3A outline a method for creating synchronization sequence "B". Similarly, steps 234-258 of FIG. 3B outline a method for creating channel estimation sequence C.

As previously discussed, telemetry preamble 175 may have two goals: Synchronization, determining the beginning of the transmitted preamble 175 by telemetry receiver 131 as accurately as possible; and channel estimation, enabling an initial accurate estimation of the channel impulse response by telemetry receiver 131. In order to support these goals, according to one or more embodiments preamble 175 is characterized by a sharp autocorrelation peak. Assuming that a continuous cross-correlation of the signal received at telemetry receiver 131 with a reference signal is calculated, a sharp autocorrelation function will aid in the detection of the exact timing of the commencement of preamble 175. Once the beginning of preamble 175 is detected by telemetry receiver 131, preamble 175 may be used to calculate the channel impulse response using a method such as Least Squares. In order to calculate this response, an optimal signal may be a flat wide-band signal characterized by a spectrum that covers the entire transmission band. Such a signal is also characterized by a sharp autocorrelation peak.

Referring to FIG. 3A, at step 204 initial conditions are set. A counter variable I and a variable MAX_IX are initialized to zero. At step 208, a set of discrete, non-repeating sequences of bits is iteratively created using random or pseudorandom generated bits. Each sequence represents one period of fixed pulses separated by varying pulse intervals PI. A period is made up of a number M pulses, as described hereinafter. From this set, synchronization sequence "B" may be selected as having the flattest frequency spectrum of all the sequences in the set.

In particular, for each iteration of step 208, a cost function IX representative of the flatness of the frequency spectrum of the generated sequence is calculated at step 212. If the current cost function IX is greater than the value presently stored in variable MAX_IX (step 216), at step 220 MAX_IX is updated to the current cost function IX, and the current sequence is stored in a temporary sequence variable Bf. At step 208, counter variable I is incremented by the number of bits generated to create the evaluated sequence, which is described in greater detail below. At step 224, the cycle of steps 208-220 may be repeated until each non-repeating sequence of the set has been evaluated, thereby allowing selection of the synchronization sequence "B" of maximal spectral flatness. In one or more embodiments, the set of sequences may include up to a number $(2^N-1)/MD$ of nonrepeating sequences, as described in greater detail hereinafter.

After selection of synchronization sequence "B", a similar process may be used to select the channel estimation sequence "C". Referring to FIG. 3B, at step 234 initial conditions are set. A counter variable I and a variable MIN_XC are initialized to zero. At step 238, sequences are again iteratively generated from the set of discrete, non-repeating sequences. As before, each sequence represents one period of M fixed pulses separated by varying pulse intervals PI. From this set, channel estimation sequence "C" may be selected as having the minimum cross-correlation of all the sequences in the set with respect to synchronization sequence "B".

In particular, for each iteration of step 238, a cross-correlation XC of the generated sequence with synchronization sequence "B" is calculated at step 242. If the current cross-correlation XC is less than the value presently stored in variable MIN_XC (step 246), at step 250 MIN_XC is updated to the current cross-correlation XC, and the current sequence is stored in a temporary sequence variable Cf. Also at step 238, counter variable I is incremented by the number of bits generated to create the evaluated sequence, which is described in greater detail below. At step 254, the cycle of steps 228-250 may be repeated until each non-repeating sequence of the set has been evaluated, thereby allowing selection of the channel estimation sequence "C" characterized by minimal cross-correlation with synchronization sequence "B". In one or more embodiments, the set of sequences may include up to a number $(2^N-1)/MD$ of nonrepeating sequences, as described in greater detail hereinafter.

According to one or more embodiments, at step 270, preamble 175 (FIG. 1) is assembled to have a number of serially repeated periods of synchronization sequence "B" followed by an instance of channel estimation sequence "C". According to one or more embodiments, preamble 175 enables a reliable detection of the beginning of a transmitted signal with high accuracy in a noisy environment, which may be accomplished by including within preamble 175 several serially repeated periods of synchronization sequence "B". The number and length of synchronization sequences "B" may be set so noise may be sufficiently averaged but the frequency spectrum will remain as flat as possible. The number of repeated periods of synchronization sequence "B" is a compromise between the need for accurate detection of the data stating point and the accuracy of the channel estimation. Assuming the total length of preamble 175 to be limited by the allowed system overhead, increasing the number of periods of synchronization sequence "B" improves the accuracy of the determination of the data starting point but lowers the resolution of the initial channel estimate. If the total number of periods in preamble 175 is $N_P$, there may be $N_P-1$ serial instances of synchronization sequence "B" followed by a single channel estimation sequence C. In one or more embodiments, preamble 175 may have five periods, consisting of four synchronization sequences "B" followed by a single channel estimation sequence C. However, preamble 175 may consist of a different number of periods $N_P$ as appropriate.

Figure 4:
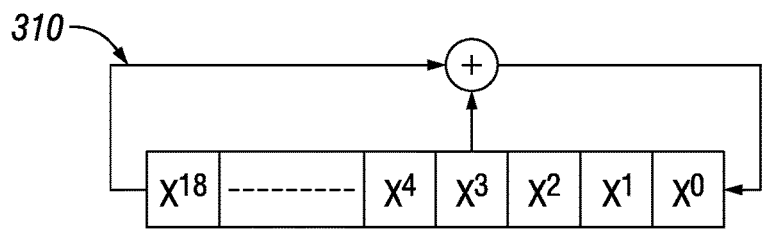
FIG. 4 is an upper level functional block diagram of an exemplary pseudonoise generator, according to an embodiment, for use in the system of FIG. 1.

Generation of the set of discrete, non-repeating sequences of steps 208 and 238 is now described in greater detail. FIG. 4 illustrates the operation of a pseudonoise (PN) sequence generator 310, which in one or more embodiments may be implemented by a linear feedback shift register (LFSR). PN sequence generator 310 may generate a pseudorandom sequence of bits by connecting the linear feedback shift register based on the properties of a primitive polynomial—a polynomial is that it is evenly divisible only by itself and 1. An example of a primitive polynomial of order 18, which is implemented by PN sequence generator 310 of FIG. 4, is $x^{18}+x^3+1$. A notable feature of a PN sequence that is generated by a primitive polynomial of order N is that the sequence does not repeat until the entire $N^{th}$ order sequence has been generated. In other words, the period of the pseudorandom sequence in bits is $2^N-1$. In the example of FIG. 4, the period of the sequence is $2^{18}-1$, or 262,143 bits. In steps 208 and 238 of FIGS. 3A and 3B, counter variable I may be incremented for each iteration of, or bit produced by, PN sequence generator 310.

Although FIG. 4 illustrates a PN sequence of the 18th order, any suitable order may be used as appropriate. In one or more embodiments, PN sequence generator 310 may be implemented using MATLAB® or other simulation software. Moreover, other techniques for generating a random or pseudorandom sequence of bits may also be used.

Figure 5:
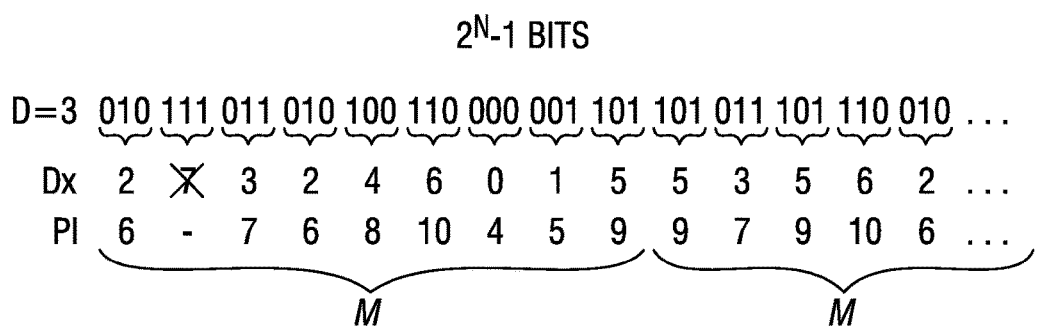
FIG. 5 is a diagram that illustrates a technique for generating a set of discrete, nonrepeating pulse width sequences, according to an embodiment, for use in the system of FIG. 1.

FIG. 5 illustrates the process of resolving the pseudorandom sequence of $2^N-1$ bits into a set of sequences of M fixed pulses separated by varying pulse intervals PI. First, the pseudorandom sequence of $2^N-1$ bits generated by PN sequence generator 310 may be split to groups of D bits, where the number D is based on the physical and/or electrical constraints of telemetry transmitter 134 (FIG. 1). For example, if the minimum pulse interval $PI_{min}$ is 4 chips and the maximum pulse interval $PI_{max}$ is 10 chips, there are seven different options of pulse intervals requiring three bits to describe. In general, the number of bits needed may be given by Equation 1:

$$D=ceil(\log_2(PI_{max}-PI_{min}))\qquad\text{Eq. 1}$$

where ceil(x) is a function that selects the smallest integer larger then x. Splitting the pseudorandom sequence of $2^N-1$ bits into groups of D consecutive bits results in a non-repeating series of $(2^N-1)/D$ groups of D bits.

In one or more embodiments, each group of D bits may be expressed as a decimal number $D_x$ and may define the next pulse interval PI measured in chips. Thus, in the above example of $PI_{min}=4$ and $PI_{max}=10$, the bit combination "0 0 0" ($D_x=0$) represents a PI of 4 chips, "0 1 1" ($D_x=3$) represents a PI of 7 chips, and "1 1 1" ($D_x=7$) represents a PI of 10 chips, etc.

In order to meet all the physical and/or electrical constraints of telemetry transmitter 131 and/or the communications channel, each number $D_x$ may be compared to the maximum and minimum pulse intervals. If $PI_{min} \leq D_x \leq PI_{max}$, the number $D_x$ may be retained and used to define the next pulse interval PI; if $D_x$ falls outside of the $PI_{min}$ and $PI_{max}$ limits, that number $D_x$ may be discarded. This process may be repeated until the entire sequence $(2^N-1)/D$ of numbers $D_x$ has been evaluated or the total number of pulses needed to define synchronization sequence "B" or channel estimation sequence "C" has been generated. Because some numbers $D_x$ may be discarded, the total usable pulse intervals PI generated may be less than $(2^N-1)/D$. An example of a discarded $D_x$ is illustrated in FIG. 5.

Next, the pulse intervals PI generated in the step above may be further subdivided to define a set of sequences of M pulse intervals PI. The number M represents the number of pulses in each sequence and is referred to as one period. In one or more embodiments, the value M may be selected based on the maximum expected channel impulse response length. Because preamble 175 may be used for channel impulse response estimation, the period M measured in time should be longer than the maximum expected channel impulse response length L. The maximum expected channel impulse response length L may be determined by the number of reflections in drill string 108 (FIG. 1) defining the communications channel. Empirical data from different wells show that the maximum expected channel impulse response length L is usually less than two seconds. There may be reflections that arrive after two seconds, but such delayed reflections are usually much attenuated compared to the initial reflections. In order to be able to obtain a good initial channel impulse response estimate in a very noisy environment, in one or more embodiments, a period length of at least five times the maximum expected channel impulse response length L may be selected.

Steps 212, 216, and 220 of FIG. 3A—the selection of synchronization sequence "B"—are now described in greater detail. There are several criteria that can be used to select the best synchronization sequence "B" from the generated set of discrete, non-repeating sequences. In one or more embodiment, the criterion of maximum spectral flatness of the sequence in the frequency domain may be used. In the time domain, this criterion translates into minimal width of the autocorrelation function, with the best synchronization sequence "B" being characterized by an autocorrelation function approaching a delta function. The flatness of the spectrum is also appropriate for good channel estimation.

There are many ways to calculate the flatness of the spectrum of a given sequence. In one or more embodiments, a normalized Fourier Transform of the sequence autocorrelation $AX_n(k)$ may be first calculated, where P is the length or period of the sequence:

$$X(k) = \sum_{n=0}^{P-1} x_n e^{-j2\pi nk/P} \qquad \text{Eq. 2}$$

$$AX_n(k) = \frac{X(k) * X(k)^*}{\|X\|^2}. \qquad \text{Eq. 3}$$

Next the "Entropy" in frequency domain may be calculated:

$$IX = -\sum_{k=0}^{P-1} AX_n(k) * \log(AX_n(k)) \qquad \text{Eq. 4}$$

Equation 4 may be used as a cost function to select the best sequence. As described above with respect to FIG. 3A, cost function IX may be calculated for each new generated sequence of the set of non-repeating sequences, and the sequence with the maximum cost function IX may be selected as the best synchronization sequence "B".

Steps 242, 246, and 250 of FIG. 3B—the selection of channel estimation sequence "C"—are now described in greater detail. A cross-correlation function XC may be calculated for each new generated sequence of the set of non-repeating sequences, and the sequence with the minimum (i.e., more negative) cross-correlation XC with synchronization sequence "B" may be selected as the best channel estimation sequence "C". The normalized cross-correlation XC between synchronization sequence "B" and currently evaluated sequence may be calculated as follows:

$$XC_C = \frac{\sum_{i=0}^{P-1} B(p) * C(p)}{\left[\sum_{i=0}^{P-1} B(p)^2 \sum_{i=0}^{P-1} C(p)^2\right]^{1/2}} \qquad \text{Eq. 5}$$

Having thus described how to assemble preamble 175, the use of preamble 175 for sequence detection at telemetry receiver 131 (FIG. 1) is now described. Detection of preamble 175 uses the periodicity provided by the repeated periods of synchronization sequence "B". In one or more embodiments, telemetry receiver 131 may include a correlator (not expressly illustrated). A number of autocorrelation calculations may be performed by the correlator using sections of the signal received by telemetry receiver 131 that are multiples of the period length P in chips of synchronization sequence "B". The autocorrelation equation may be expressed as:

$$cor(k) = \frac{\left(\sum_{i=0}^{P-1} x_i x_{i-kP}\right)^2}{\sum_{i=0}^{P-1} x_i^2 \sum_{i=0}^{P-1} x_{i-kP}^2} \qquad \text{Eq. 6}$$

where k ranges between 1 and $N_P-2$, and $N_P$ is the number of periods in preamble 175.

Figure 6:
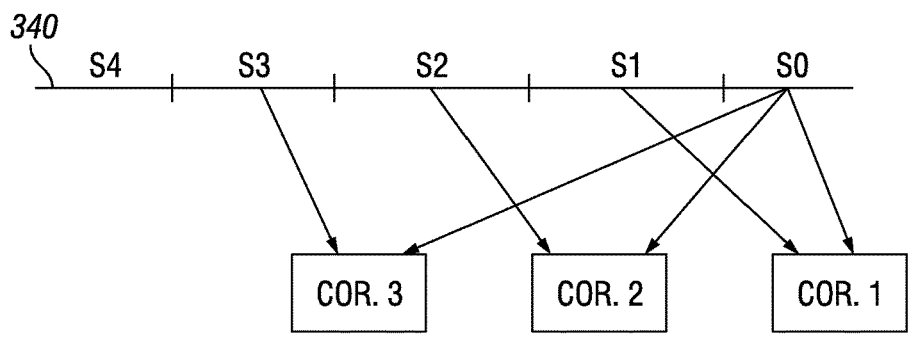
FIG. 6 is a diagram that illustrates a technique for detecting a preamble generated according to the method of FIGS. 3A and 3B according to an embodiment, for use in the system of FIG. 1.

FIG. 6 shows sections S0, S1, S2, S3, S4, etc. of the received signal 340 that are being autocorrelated as described above for the case of $N_P=5$. Each correlation is P samples long. When preamble 175 is analyzed at the corellator, sections S0, S1, S2, S3, S4, etc. will overlap but not necessarily align with the received synchronization sequences "B".

Other autocorrelation combinations may also be calculated, such as S1 with S2, S2 with S3, and so on. Altogether there $$\binom{N_P}{2}$$

different autocorrelations that may be calculated. An advantage of using the autocorrelation calculations cor(1), cor(2), cor(3), etc. of Equation 6 and FIG. 6 is that the sum of these autocorrelations may have a steep downward slope, which be used for an accurate detection of the preamble end point as described below.

Figure 7:
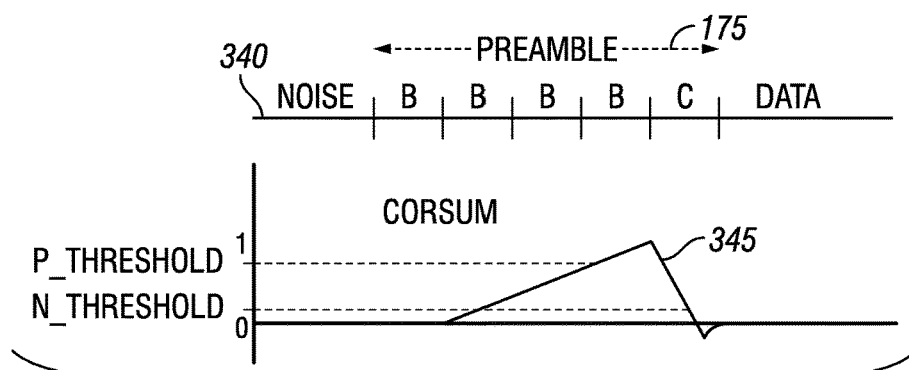
FIG. 7 is a diagram that illustrates a technique for detecting a preamble generated according to the method of FIGS. 3A and 3B according to an embodiment, for use in the system of FIG. 1.

Referring now to FIG. 7, the autocorrelation calculations of Equation 6, cor(1), cor(2), cor(3), etc., may then be averaged together by the correlator as follows:

$$Corsum = \frac{1}{(N_P - 2)} \sum_{k=1}^{N_P-2} cor(k) \qquad \text{Eq. 7}$$

In the ideal case, as preamble 175 of received signal 340 is analyzed, the correlator Corsum output 345 will behave as illustrated in FIG. 7. The Corsum output 345 will stay close to 0 as long as received signal 340 contains only noise. Once the second period of preamble 175 starts, the Corsum output 345 will start to rise linearly until the end of the last period of synchronization sequence "B", at which point the Corsum output 345 will reach approximately unity. Then, during the channel estimation sequence "C", the Corsum output 345 will rapidly fall to some low value that depends on the cross-correlation between synchronization sequence "B" and channel estimation sequence "C".

The shape of the Corsum output 345 curve may be used to estimate the end of the preamble and the start of MWD/LWD data in various ways. In one or more embodiments, two thresholds may be defined—a positive threshold (P_threshold) and a negative threshold (N_threshold). The correlator may be considered as a state machine, which starts in a "no signal" state (state 0). In the "no signal" state, the correlator looks for the Corsum output 345 to pass above P_threshold. Once the Corsum output 345 passes the P_threshold, the state switches to "preamble" (state 1). Thereafter, the correlator looks for the Corsum output 345 to drop below N_threshold. The Corsum output 345 dropping below N_threshold signals the end of preamble 175. The state switches to "preamble end" (state 2) and then may return to the "no signal" state.

Figure 8:
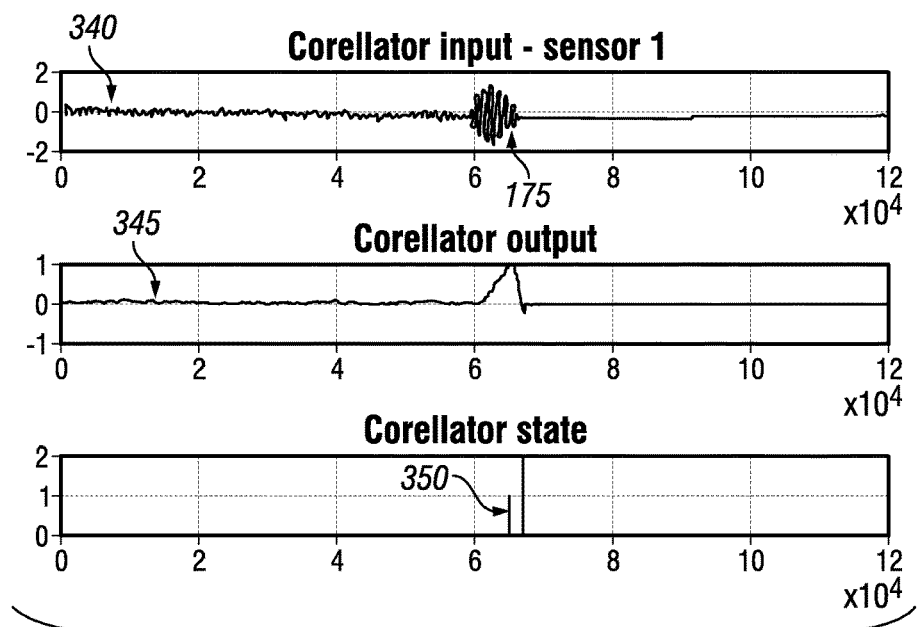
FIG. 8 is a diagram that illustrates a technique for detecting a preamble generated according to the method of FIGS. 3A and 3B according to an embodiment, for use in the system of FIG. 1.

FIG. 8 illustrates an exemplary case of the Corsum behavior with a simulated received signal 340. The thresholds in this example are P_threshold=0.85 and N_threshold=−0.1. As can be seen, there is a noise period until approximately sample 60000, and the corellator Corsum output 345 and the correlator state 350 remain at zero. Preamble 175 starts at approximately sample 60000. The corellator Corsum output 345 rises slowly to almost 1.0, and as Corsum output 345 reaches P_threshold=0.85, correlator state 350 changes to state 1. At approximately sample 65000, channel estimation sequence "C" begins. The Corsum output 345 begins falls sharply to approximately −0.3, and when the Corsum output 345 reaches N_threshold=−0.1, and correlator state 350 changes to state 2, and then back to state 0.

Once preamble 175 is detected at telemetry receiver 131 (FIG. 1), preamble 175 may be used to estimate the impulse response of the communications channel (drill pipe 108). There are many ways to do this estimation both in the frequency domain and the time domain. In one or more embodiments, a Least Squares (LS) mathematical method may be used to calculate the pseudo inverse of the correlation matrix of preamble 175 and multiply the pseudo inverse by the received signal to produce an estimated channel impulse response as follows.

Assume the entire preamble 175 is defined by the sequence $[x_0, x_1, \ldots, x_N]$, where $N=P*N_P$, P is the length of one period, and $N_P$ is the number of periods in preamble 175. Further, assume that the maximum channel impulse response is defined by length L. As discussed earlier, the value L may be determined empirically, using simulations, or calculated based on a physical model of the communications channel.

The following matrix may be defined:

$$A = \begin{bmatrix} 0, & 0, & \ldots & 0, & x_0, & x_1, & \ldots & x_{N-L} \\ 0, & \ldots & 0, & x_0, & x_1, & \ldots & \ldots & x_{N-L+1} \\ & & & & \vdots & & & \\ x_0, & x_1, & \ldots & \ldots & \ldots & \ldots & \ldots & x_{N-1} \end{bmatrix} \quad \text{Eq. 8}$$

Next, the autocorrelation matrix $R=A*A^T$ may be generated. The pseudo-inverse of A is $A_{inv}=R^{-1}A$. Once the end point of preamble 175 is determined as described above, the last N samples, referred to herein as Y, may be multiplied by $A_{inv}$, as shown in Equation 9. The result, $h_{channel}$, is the channel impulse response estimate:

$$h_{channel}=A_{inv}*Y \quad \text{Eq. 9}$$

Thus, as described herein, a mud pulse telemetry system and method that employs preamble 175 may be suitable for both sequence detection and channel estimation, satisfy all the physical and/or electronic constraints of the telemetry system, and allow for fast convergence of an adaptive channel tracking or equalization system.

Although the above description was in relation to an embodiment using DPPM, it may be used with other modulation schemes. For example, in addition to varying the pulse intervals PI, pulse widths PW may also be modulated to carry signal information. In such a case, each pulse width PW and pulse interval PI may be correspond to a number $D_x$ that satisfies the criteria for minimum and maximum pulse widths $PW_{min}$, $PW_{max}$ and minimum and maximum pulse intervals $PI_{min}$, $PI_{max}$, respectively. Synchronization sequence "B" and channel estimation sequence "C" may be selected, generally as described above, from a set of $(2^N-1)/2MD$ of nonrepeating sequences.

In summary, a telemetry method and system have been described. Embodiments of the method of telemetry may generally include: Defining a synchronization sequence of pulses separated by varying pulse intervals, the synchronization sequence characterized by a generally flat frequency spectrum, the synchronization sequence defining a period length P; defining a channel estimation sequence of pulses separated by varying pulse intervals, the channel estimation sequence characterized by a low cross-correlation with the synchronization sequence; defining a preamble having a number Np−1 of serially repeated periods of the synchronization sequence followed by an instance of the channel estimation sequence; and transmitting the preamble by a transmitter across a communication channel. Embodiments of the telemetry system may generally have: A transmitter; a receiver; and a communication channel coupling the transmitter with the receiver; the transmitter designed and arranged to transmit a signal including preamble having a number Np−1 of serially repeated periods of a synchronization sequence followed by an instance of a channel estimation sequence, the synchronization sequence characterized by a generally flat frequency spectrum, the channel estimation sequence characterized by a low cross-correlation with the synchronization sequence; the receiver designed and arranged to receive and autocorrelate the signal to identify the serially repeated periods of the synchronization sequence and estimate an endpoint of the channel estimation sequence.

Any of the foregoing embodiments may include any one of the following elements or characteristics, alone or in combination with each other: Selecting a total number P*Np to define a preamble length that exceeds a maximum expected impulse response length of the channel in time; generating a set of non-repetitive sequences each having a number M of pulses separated by the number M of pulse intervals; selecting from the set the synchronization sequence having a maximally flat frequency spectrum; selecting from the set the channel estimation sequence having a minimal cross-correlation with the synchronization sequence; calculating an autocorrelation of each of the set to select the synchronization sequence; defining a minimum pulse interval by a minimum number of chips; defining a maximum pulse interval by a maximum number of the chips; determining a minimum number D of digital bits required to encode any number of chips ranging from the minimum number of the chips to the maximum number of the chips; generating a series of digital bits; separating the series of digital bits by the number D to define a series of pulse intervals; separating the series of pulse intervals into groups of the number M to generate the set; generating the series of digital bits using a PN sequence generator; receiving by a receiver a signal including the transmitted preamble; detecting the transmitted preamble; estimating an identifiable point in the transmitted preamble; repetitively calculating autocorrelation values of the signal; identifying using the autocorrelation values the serially repeated periods of the synchronization sequence in the transmitted preamble; identifying using the autocorrelation values an endpoint of the instance of the channel estimation sequence as the identifiable point in the transmitted preamble; each of the autocorrelation values is an average of a plurality of autocorrelations of the signal, each of the plurality of autocorrelations having a number of samples equal to the period length P, the plurality of autocorrelations characterized by delays that are multiples of the period length P; estimating an impulse response of the channel using the transmitted preamble; varying by the transmitter widths of the pulses; the synchronization and channel estimation sequences each have a number M of pulses separated by the number M of varying pulse intervals; the synchronization sequence defines a period length P; a total number P*Np defines a preamble length that exceeds a maximum expected impulse response length of the channel; the transmitter is limited by a minimum pulse interval; the telemetry system further constrains the varying pulse intervals above the minimum pulse interval; the transmitter is limited by a minimum pulse width and a maximum pulse width; the telemetry system further constrains the varying the pulses between the minimum pulse width and the maximum pulse width; the receiver is designed and arranged to calculate an estimated channel impulse response length using the preamble; and the transmitter varies widths of the pulses.

The Abstract of the disclosure is solely for providing the reader a way to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. A method of telemetry, comprising:
   defining a synchronization sequence of pulses separated by varying pulse intervals, said synchronization sequence characterized by a generally flat frequency spectrum, said synchronization sequence defining a period length P;
   defining a channel estimation sequence of pulses separated by varying pulse intervals, said channel estimation sequence characterized by a low cross-correlation with said synchronization sequence;
   defining a preamble having a number $N_p-1$ of serially repeated periods of said synchronization sequence followed by an instance of said channel estimation sequence; and
   transmitting said preamble by a transmitter across a communication channel.

2. The method of claim 1 further comprising:
   selecting a total number $P*N_p$ to define a preamble length that exceeds a maximum expected impulse response length of said channel in time.

3. The method of claim 1 further comprising:
   generating a set of non-repetitive sequences each having a number M of pulses separated by said number M of pulse intervals;
   selecting from said set said synchronization sequence having a maximally flat frequency spectrum; and then
   selecting from said set said channel estimation sequence having a minimal cross-correlation with said synchronization sequence.

4. The method of claim 3 further comprising:
   calculating an autocorrelation of each of said set to select said synchronization sequence.

5. The method of claim 3 further comprising:
   defining a minimum pulse interval by a minimum number of chips;
   defining a maximum pulse interval by a maximum number of said chips;
   determining a minimum number D of digital bits required to encode any number of chips ranging from said minimum number of said chips to said maximum number of said chips;
   generating a series of digital bits;
   separating said series of digital bits by said number D to define a series of pulse intervals; and
   separating said series of pulse intervals into groups of said number M to generate said set.

6. The method of claim 5 further comprising:
   generating said series of digital bits using a PN sequence generator.

7. The method of claim 1 further comprising:
   receiving by a receiver a signal including said transmitted preamble;
   detecting said transmitted preamble; and
   estimating an identifiable point in said transmitted preamble.

8. The method of claim 7 further comprising:
   repetitively calculating autocorrelation values of said signal;
   identifying using said autocorrelation values said serially repeated periods of said synchronization sequence in said transmitted preamble; and
   identifying using said autocorrelation values an endpoint of said instance of said channel estimation sequence as said identifiable point in said transmitted preamble.

9. The method of claim 8 wherein:
   each of said autocorrelation values is an average of a plurality of autocorrelations of said signal, each of said plurality of autocorrelations having a number of samples equal to said period length P, said plurality of autocorrelations characterized by delays that are multiples of said period length P.

10. The method of claim 7 further comprising:
    estimating an impulse response of said channel using said transmitted preamble.

11. The method of claim 1 further comprising:
    varying by said transmitter widths of said pulses.

12. A telemetry system, comprising:
    a transmitter;
    a receiver; and
    a communication channel coupling said transmitter with said receiver;
    said transmitter designed and arranged to transmit a signal including preamble having a number $N_p-1$ of serially repeated periods of a synchronization sequence followed by an instance of a channel estimation sequence, said synchronization sequence characterized by a generally flat frequency spectrum, said channel estimation sequence characterized by a low cross-correlation with said synchronization sequence;
    said receiver designed and arranged to receive and auto-correlate said signal to identify said serially repeated periods of said synchronization sequence and estimate an endpoint of said channel estimation sequence.

13. The telemetry system of claim 12 wherein:
    said synchronization and channel estimation sequences each have a number M of pulses separated by said number M of varying pulse intervals;
    said synchronization sequence defines a period length P; and
    a total number $P*N_p$ defines a preamble length that exceeds a maximum expected impulse response length of said channel.

14. The telemetry system of claim 13 wherein:
    said transmitter is limited by a minimum pulse interval; and
    the telemetry system further constrains said varying pulse intervals above said minimum pulse interval.

15. The telemetry system of claim 13 wherein:
    said transmitter is limited by a minimum pulse width and a maximum pulse width; and
    the telemetry system further constrains said varying said pulses between said minimum pulse width and said maximum pulse width.

16. The telemetry system of claim 12 wherein:
said receiver is designed and arranged to calculate an estimated channel impulse response length using said preamble.

17. The telemetry system of claim 13 wherein:
said transmitter varies widths of said pulses.

* * * * *